(12) United States Patent
Liu

(10) Patent No.: US 12,288,241 B2
(45) Date of Patent: Apr. 29, 2025

(54) METHOD AND APPARATUS FOR PRESENTING RECOMMENDATION DATA, COMPUTER DEVICE, AND STORAGE MEDIUM

(71) Applicant: BEIJING BYTEDANCE NETWORK TECHNOLOGY CO., LTD., Beijing (CN)

(72) Inventor: Yun Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/755,436

(22) Filed: Jun. 26, 2024

(65) Prior Publication Data

US 2024/0346567 A1    Oct. 17, 2024

Related U.S. Application Data

(63) Continuation of application No. PCT/CN2023/074322, filed on Feb. 3, 2023.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0641* (2013.01)

(58) Field of Classification Search
CPC .............................. G06Q 30/06–08
See application file for complete search history.

(56) References Cited

U.S. PATENT DOCUMENTS

| | | | | |
|---|---|---|---|---|
| 8,606,652 B2 * | 12/2013 | Gonsalves | ......... | G06Q 30/0643 705/26.7 |
| 8,631,029 B1 * | 1/2014 | Amacker | ............ | G06F 16/5866 707/766 |
| 2012/0310773 A1 * | 12/2012 | Masuko | ............. | G06Q 30/0207 705/26.8 |
| 2014/0279257 A1 * | 9/2014 | Fine | ........................ | G06F 16/34 705/26.62 |

(Continued)

FOREIGN PATENT DOCUMENTS

| | | |
|---|---|---|
| CN | 107146128 A | 9/2017 |
| CN | 107360222 A | 11/2017 |

(Continued)

OTHER PUBLICATIONS

"NeuVis Client Launches Online Marketplace to Expand International Trade with Asia", Business Wire, Jun. 27, 2001: 2154 (Year: 2001).*

(Continued)

*Primary Examiner* — Ethan D Civan
(74) *Attorney, Agent, or Firm* — BakerHostetler

(57) ABSTRACT

The disclosure provides a method and apparatus for presenting recommendation data, a computer device, and a storage medium. The method includes: presenting a first search middle page in response to a trigger operation on a search box in a target page; obtaining commodity information of a related commodity of a target commodity presented in the target page; and presenting the commodity information of the related commodity in a preset area of the first search middle page.

20 Claims, 6 Drawing Sheets

(56) References Cited

U.S. PATENT DOCUMENTS

2014/0298184 A1\* 10/2014 Bailin ................ G06Q 30/0623
715/738
2017/0300985 A1\* 10/2017 Takahashi .......... G06Q 30/0601

FOREIGN PATENT DOCUMENTS

| CN | 111489219 A | 8/2020 |
| --- | --- | --- |
| CN | 113111286 A | 7/2021 |
| CN | 113505313 A | 10/2021 |
| CN | 113792181 A | 12/2021 |
| CN | 113867881 A | 12/2021 |
| CN | 114595404 A | 6/2022 |
| WO | WO 2021/238667 A1 | 12/2021 |

OTHER PUBLICATIONS

International Patent Application No. PCT/CN2023/074322; Int'l Search Report; dated May 12, 2023; 3 pages.

\* cited by examiner

METHOD AND APPARATUS FOR PRESENTING RECOMMENDATION DATA, COMPUTER DEVICE, AND STORAGE MEDIUM

CROSS-REFERENCE TO RELATED APPLICATION(S)

The application is a continuation of PCT Application Serial No. PCT/CN2023/074322, filed Feb. 3, 2023, which claims the priority to Chinese Patent Application No. 202210240612.2 filed on Mar. 10, 2022 and entitled "Method and Apparatus for Presenting Recommendation Data, Computer Device, and Storage Medium", the disclosures of which are incorporated herein by reference in their entireties.

FIELD

The disclosure relates to the technical field of computers, in particular to a method and apparatus for presenting recommendation data, a computer device, and a storage medium.

BACKGROUND

With the continuous development of electronics and network technology, online shopping has gradually become indispensable to human lives, which makes it increasingly common that products satisfying demand are recommended to users according to their intentions.

However, in an existing scheme for presenting commodity recommendation data, merely information such as a search history of the user can be presented in general after a trigger operation by the user on a search box in a current page is detected. When the users intend to view commodities similar to those presented in the current page, they have to search for the same by typing in keywords the search box. Thus, the existing scheme for presenting recommendation data is inaccurate in matching search intentions of the users and cannot satisfy efficient search demand of the users in most cases.

SUMMARY

Examples of the disclosure at least provide a method and apparatus for presenting recommendation data, a computer device, and a storage medium.

In a first aspect, the example of the disclosure provides a method for presenting recommendation data. The method includes:
  presenting a first search middle page in response to a trigger operation on a search box in a target page; obtaining commodity information of a related commodity of a target commodity presented in the target page, where the commodity information corresponds to at least one content genre, and different content genres correspond to different commodity introduction modes; and presenting the commodity information of the related commodity in a preset area of the first search middle page.

In an optional embodiment, the method further includes: determining a target commodity introduction mode corresponding to target commodity information in response to a trigger operation on the target commodity information in the first search middle page; obtaining a commodity presentation page matching the target commodity introduction mode, where the commodity presentation page includes any one of the following: a commodity live streaming page, a commodity detail page and a commodity related video playing page; and jumping to the commodity presentation page, and presenting commodity detail information of a target related commodity in the commodity presentation page.

In an optional embodiment, the related commodity is a commodity that satisfies a requirement for preset similarities in commodity parameters of the target commodity among at least one commodity (for example, all commodities) matching the target commodity, where the commodity parameters include at least one of the following: a commodity attribute parameter, a commodity introduction mode, key commodity description information, commodity search information in a commodity detail page of the target commodity, and a commodity popularity parameter.

In an optional embodiment, the obtaining commodity information of a related commodity of a target commodity presented in the target page includes:
  obtaining at least one content genre estimated based on the commodity parameter of the target commodity; and screening commodity information of a related commodity that matches the at least one content genre from the at least one commodity matching the target commodity.

In an optional embodiment, the method includes:
  obtaining an operation level of a browsing operation on a commodity that matches the target commodity by a user within a preset period, where the operation level is configured to indicate an operation frequency of the browsing operation; and determining a presentation position matching the operation level of the browsing operation in the first search middle page, and determining the preset area based on the presentation position matched.

In an optional embodiment, the commodity information includes commodity sub-information corresponding to a plurality of content genres, each piece of commodity sub-information corresponds to one content genre, and the preset area includes a plurality of sub-areas; and the presenting the commodity information of the related commodity in a preset area of the first search middle page includes:
  determining an information presentation form matched based on the content genre of each piece of commodity sub-information, where a plurality of types of commodity sub-information include at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio; determining a target view control matching the information presentation form; and presenting, based on the target view control, commodity sub-information of related commodities in sub-areas corresponding to the related commodities.

In an optional embodiment, the presenting the commodity information of the related commodity in a preset area of the first search middle page includes:
  obtaining a commodity classification tag corresponding to the related commodity, where the commodity classification tag is a category tag determined after aggregation of commodity categories of related commodities; determining a target view control of the commodity information of the related commodity based on a number of the commodity classification tags; and presenting the commodity information of the related commodity in the preset area of the first search middle page based on the target view control.

In an optional embodiment, the target view control includes a first control, the first control includes a first presentation sub-area and a second presentation sub-area, and the first presentation sub-area is located above the second presentation sub-area; and the presenting the commodity information of the related commodity in the preset area of the first search middle page based on the target view control includes:

presenting commodity preview information of the commodity information in the first presentation sub-area under the condition that the number of the commodity classification tags does not satisfy a preset number requirement, where the commodity preview information includes at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio; and presenting commodity description information of the commodity information in the second presentation sub-area, where the commodity description information includes information for assisting a user in executing a corresponding decision.

In an optional embodiment, the target view control includes a second control, the second control includes third presentation sub-areas and a fourth presentation sub-area, and the third presentation sub-areas are located at two sides of the fourth presentation sub-area; and the presenting the commodity information of the related commodity in the preset area of the first search middle page based on the target view control includes:

presenting at least a part of the commodity classification tags in the third presentation sub-area under the condition that the number of the commodity classification tags satisfies a preset number requirement; determining commodity preview information corresponding to the commodity classification tags from commodity preview information of the commodity information; and presenting the commodity preview information corresponding to the commodity classification tags in the fourth presentation sub-area, where the commodity preview information includes at least one of the following: commodity live streaming information, a commodity related video and static commodity information, the commodity live streaming information includes any one of the following: key commodity description information including a commodity live streaming icon, and a real-time live streaming picture, the commodity live streaming icon is an icon for jumping to a corresponding live streaming studio, and the commodity related video includes a commodity usage instruction video and/or a commodity assessment video.

In an optional embodiment, the method further includes: obtaining target commodity preview information corresponding to a target commodity classification tag in response to a trigger operation on the target commodity classification tag; and switchably presenting, in the fourth presentation sub-area, the target commodity preview information corresponding to the target commodity classification tag.

In an optional embodiment, the commodity classification tag includes a plurality of sub-tags, each related commodity corresponds to at least one sub-tag, and each sub-tag is related to at least one content genre.

In a second aspect, the example of the disclosure further provides an apparatus for presenting recommendation data. The apparatus includes:

a first presenting unit configured to present a first search middle page in response to a trigger operation on a search box in a target page; an obtaining unit configured to obtain commodity information of a related commodity of a target commodity presented in the target page, where the commodity information corresponds to at least one content genre, and different content genres correspond to different commodity introduction modes; and a second presenting unit configured to present the commodity information of the related commodity in a preset area of the first search middle page.

In a third aspect, the example of the disclosure further provides a computer device. The computer device includes: a processor, a storage and a bus, where the storage stores a machine-readable instruction executable by the processor, the processor communicates with the storage through the bus when the computer device runs, and the machine-readable instruction executes steps in the first aspect or any possible embodiment in the first aspect when executed by the processor.

In a fourth aspect, the example of the disclosure further provides a computer-readable storage medium. The computer-readable storage medium stores a computer program, where the computer program executes steps in the first aspect or any possible embodiment in the first aspect when run by a processor.

According to the method and apparatus for presenting recommendation data, the computer device, and the storage medium provided by the examples of the disclosure, the first search middle page is presented after the trigger operation on the search box in the target page is detected, the commodity information of the related commodity of the target commodity presented in the target page is determined, and then, the commodity information of the related commodity is presented in the preset area of the first search middle page. Thus, a search path of the user is reduced when the target commodity cannot satisfy a search intention of the user, the related commodity of the target commodity is presented to the user in a more convenient way, accuracy of matching of the search intention of the user is improved, and search efficiency is improved.

In order to make the above objectives, features, and advantages of the disclosure clearer and more comprehensible, detailed description will be made below with reference to preferred examples and in conjunction with accompanying drawings.

BRIEF DESCRIPTION OF THE DRAWINGS

In order to describe technical solutions of examples of the disclosure more clearly, accompanying drawings required by the examples will be briefly introduced below. The drawings herein are incorporated into the description as a constituent part of the description, illustrate examples conforming to the disclosure, and serve to describe the technical solutions of the disclosure along with the description. It should be understood that the following accompanying drawings merely show some examples of the disclosure, and should not be considered as limitation to the scope accordingly. A person of ordinary skill in the art can still derive other relevant accompanying drawings from these accompanying drawings without creative efforts.

DETAILED DESCRIPTION OF EMBODIMENTS

Figure 1:
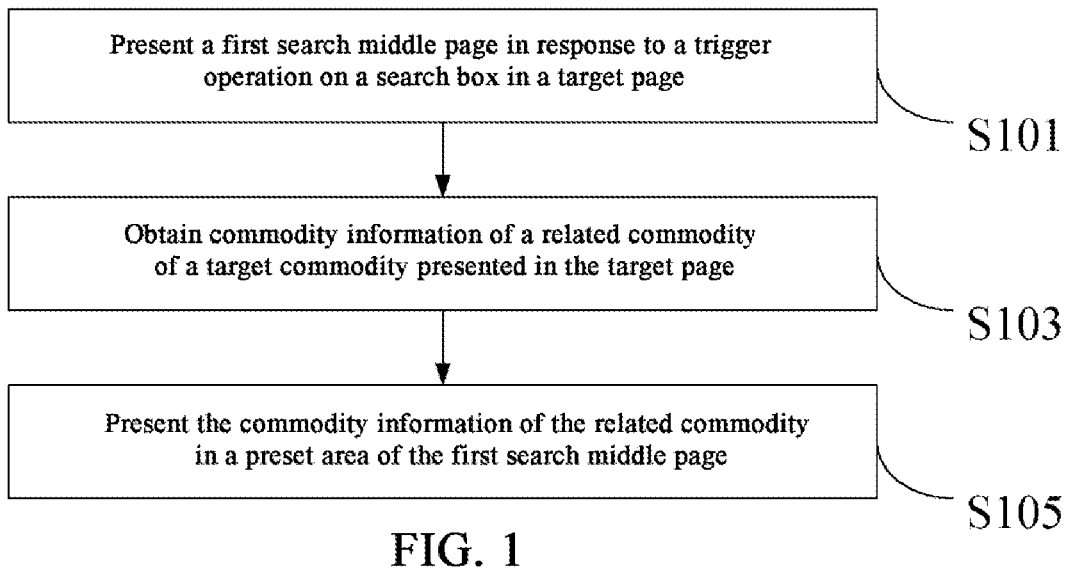
FIG. 1 shows a flowchart of a method for presenting recommendation data according to an example of the disclosure.

To make objectives, technical solutions, and advantages of examples of the disclosure clearer, the technical solutions in the examples of the disclosure will be clearly and completely described below with reference to accompanying drawings in the examples of the disclosure. Apparently, the examples described are merely some examples rather than all examples of the disclosure. In general, components that are described and shown in the accompanying drawings herein in the examples of the disclosure can be arranged and designed in various configurations. As a result, the detailed description of the examples of the disclosure as provided in the accompanying drawings below is not intended to limit the protection scope claimed by the disclosure, but merely denotes selected examples of the disclosure. All other examples derived by a person of ordinary skill in the art from the examples of the disclosure without creative efforts should fall within the protection scope of the disclosure.

It should be noted that similar reference numerals and letters indicate similar items in the following accompanying drawings, and once defined in one accompanying drawing, an item does not need to further defined and explained in subsequent accompanying drawings.

The term "and/or" herein merely describes an association and indicates existence of three relations, for example, A and/or B can mean separate existence of A, existence of both A and B, and separate existence of B. In addition, the term "at least one" herein indicates any one or any combination of at least two of a variety, for example, including at least one of A, B and C can indicate including any one or more elements selected from a set of A, B and C.

It can be found through research that in an existing scheme for presenting commodity recommendation data, merely information such as a search history of a user can be presented in general after a trigger operation by the user on a search box in a current page is detected. When the users intend to view commodities similar to those presented in the current page, they have to search for the same by typing in keywords the search box. Thus, the existing scheme for presenting recommendation data is inaccurate in matching search intentions of the users and cannot satisfy efficient search demand of the users in most cases.

Based on the research, the disclosure provides a method for presenting recommendation data according to the examples of the disclosure, a first search middle page is presented after a trigger operation on a search box in a target page is detected, commodity information of a related commodity of a target commodity presented in the target page is determined, and then, the commodity information of the related commodity is presented in a preset area of the first search middle page. Thus, a search path of the user is reduced when the target commodity cannot satisfy a search intention of the user, the related commodity of the target commodity is presented to the user in a more convenient way, accuracy of matching of the search intention of the user is improved, and search efficiency is improved.

In order to make the above objectives, features, and advantages of the disclosure clearer and more comprehensible, detailed description will be made below with reference to preferred examples and in conjunction with accompanying drawings.

In order to understand this example conveniently, a method for presenting recommendation data disclosed according to the example of the disclosure is described in detail at first. An execution subject of the method for presenting recommendation data according to the example of the disclosure is generally a computer device that has a computation capacity. In some possible embodiments, the method for presenting recommendation data may be implemented by calling, through a processor, computer-readable instructions stored in a storage.

As shown in FIG. 1, a flowchart of a method for presenting recommendation data is shown according to an example of the disclosure. The method includes S101-S105.

S101: A first search middle page is presented in response to a trigger operation on a search box in a target page.

In the example of the disclosure, the target page may be a functional page in an application having an online shopping function. The target page may be an online shopping page for presenting the target commodity for the user to browse the commodity or purchase.

Herein, the search box may be further included in the target page besides the target commodity presented and the commodity information corresponding to the target commodity. The user may input a retrieval keyword into the search box, and the application sends a request for obtaining commodity information of a commodity corresponding to the retrieval keyword to a server in response to the retrieval operation on the retrieval keyword.

In the example of the disclosure, after the trigger operation by the user on the search box is detected, the first search middle page is expanded. The first search middle page may be configured to present a browsing history of the user and a historically searched commodity.

Specifically, when the history is determined, the retrieval operation by the user within a preset period may be obtained, a retrieval keyword corresponding to the retrieval operation may be determined, and then the retrieval keyword may be used as the history of the user.

In addition, the historically searched commodity may be determined according to the history of the user when the historically searched commodity is determined. Specifically, at least one commodity type corresponding to all or some commodities corresponding to the retrieval keyword in the history may be obtained, and a plurality of commodities that are different from the history and correspond to the at least one commodity type may be determined. A preset number of previous commodities that you may want to search for may be determined from the plurality of commodities.

S103: Commodity information of a related commodity of a target commodity presented in the target page is obtained, where the commodity information corresponds to at least one content genre, and different content genres correspond to different commodity introduction modes.

In the example of the disclosure, it is necessary to determine the related commodity similar to the target commodity at first. The related commodity may be a commodity having the same commodity type as the target commodity. For example, when the target commodity is a XX brand paper towel, the commodity type of the target commodity is paper towels, and the related commodity corresponding to the target commodity may also be the paper towel.

Herein, a plurality of the related commodities may also be provided, and the commodity information corresponding to the related commodities is different. In addition, the content genre corresponding to the commodity information of the related commodities may be different. Different content genres correspond to different commodity introduction modes, and different commodity introduction modes are different in methods for introducing the commodity information corresponding to the related commodity.

Specifically, the commodity introduction modes corresponding to the different content genres may include: a video introduction, a text and/or picture introduction, a live streaming introduction, etc. Herein, the commodity introduction mode in the form of video introduction is taken as an example. When the content genre corresponding to the commodity information of the related commodity is the video introduction, the commodity information of the related commodity may be a video explanation of an appearance, a function, a usage and other information of the related commodity.

S105: The commodity information of the related commodity is presented in a preset area of the first search middle page.

Figure 2:
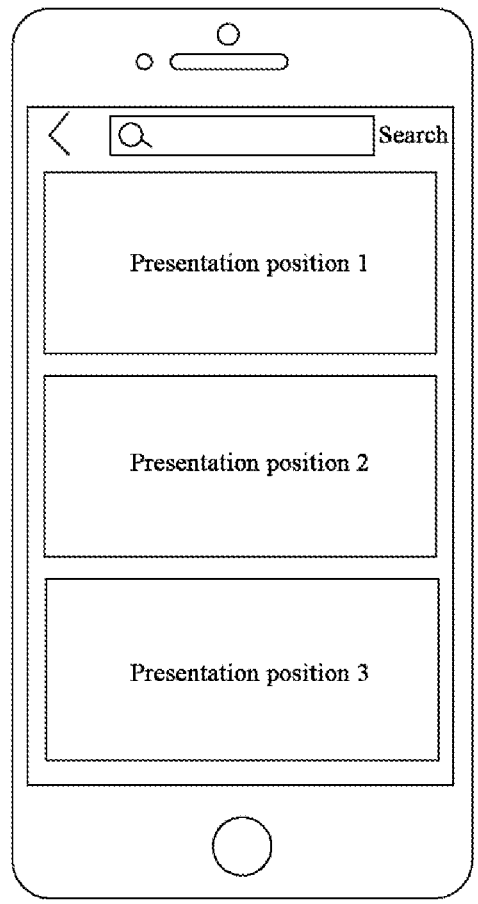
FIG. 2 shows a schematic diagram of a first search middle page according to an example of the disclosure.

In the example of the disclosure, the first search middle page may be configured to present the browsing history of the user and the previous commodities that you may want to search for, and may be further configured to present the commodity information of the related commodity. Specifically, as shown in FIG. 2, a schematic diagram of the first search middle page is shown. The first search middle page is divided into three presentation positions. The three presentation positions are configured to present the history, the historically searched commodity and the commodity information of the related commodity respectively.

Herein, when the preset area for presenting the commodity information of the related commodity is determined in the first search middle page, the preset area may be any presentation position of the three presentation positions in the first search middle page. A specific embodiment of determining the preset area is as follows, and will not be repeated herein.

It should be understood that except the preset area for presenting the commodity information of related commodity among in the three position areas of the first search middle page, the other two presentation positions may be configured to present the history and the historically searched commodity respectively.

It can be known from the description that according to the example of the disclosure, the first search middle page is presented after the trigger operation on the search box in the target page is detected, the commodity information of the related commodity of the target commodity presented in the target page is determined, and then, the commodity information of the related commodity is presented in the preset area of the first search middle page. Thus, the search path of the user is reduced when the target commodity cannot satisfy the search intention of the user, the related commodity of the target commodity is presented to the user in a more convenient way, the accuracy of matching of the search intention of the user is improved, and the search efficiency is improved.

In an optional embodiment, the related commodity is a commodity that satisfies a requirement for preset similarities in commodity parameters of the target commodity among at least one commodity matching the target commodity. The commodity parameters include at least one of the following: a commodity attribute parameter, a commodity introduction mode, key commodity description information, commodity search information in a commodity detail page of the target commodity, and a commodity popularity parameter.

In the example of the disclosure, at least one commodity matching the target commodity may be a commodity having the same type as the target commodity. After the at least one commodity is determined, the related commodity of the target commodity may be screened out from the at least one commodity.

Herein, according to the commodity parameters of the target commodity, the commodity that satisfies the requirement for preset similarity may be selected as the related commodity. Specifically, the requirement for preset similarity may be set as satisfaction of a requirement for a similarity in at least one commodity parameter of the target commodity, or satisfaction of a requirement for similarities in a part of commodity parameters of some target commodities.

In the example of the disclosure, the requirements for similarity corresponding to different parameters among the commodity parameters may be different. Specifically, the commodity attribute parameters include at least one of the following: a merchant to which the target commodity belongs, a type of the target commodity, a price of the target commodity, a delivery place of the target commodity, offer information of the target commodity (such as whether there is a coupon), etc. As a result, the requirement for the preset similarities in the commodity attribute parameters may be the same as all or some commodity attribute parameters of the target commodity.

The commodity introduction mode may include the video introduction, the text and/or picture introduction, the live streaming introduction, etc. The requirement for similarity in the commodity introduction mode may indicate the same as the commodity introduction mode of the target commodity. The key commodity description information may be a key information term including a name, for example, a box tissue and toilet paper. The requirement for the similarity in the key commodity description information may indicate that the key commodity description information of the related commodity includes a key information term including a name of the target commodity.

In addition, commodity search information in the commodity detail page of the target commodity may be the retrieval keyword corresponding to the target commodity, for example, XX flagship store. The requirement for similarity in the commodity search information in the commodity detail page may indicate that the commodity search information in the commodity detail page of the related commodity includes the commodity search information in the commodity detail page of the target commodity. The commodity popularity parameter may be determined according to the popularity information of the target commodity, such as a click-through rate, visit traffic, a purchase rate, a number of positive comments, etc. The commodity popularity parameter may be configured to characterize a hot-sale degree of the target commodity. Thus, the requirement for the similarity in the commodity popularity parameter may indicate the same as the hot-sale degree of the target commodity.

In the example of the disclosure, when the requirement for preset similarity is set as satisfaction of the requirement for the similarity in all commodity parameters of the target commodity, it is determined that the commodity is an related commodity satisfying the requirement for preset similarity merely when each commodity parameter of the commodity matching the target commodity satisfies the requirement for the similarity in a corresponding commodity parameter of the target commodity. When the requirement for the preset similarity is set as satisfaction of the requirement for the similarities in at least a part of commodity parameters of the target commodity, for example, the requirement for the preset similarity indicates satisfaction of the requirement for similarities in the commodity attribute parameter, the commodity introduction mode and the key commodity description information, the commodity may be determined as an the related commodity satisfying the requirement for the preset similarity merely when the commodity attribute parameter, the commodity introduction mode and the key commodity description information of the commodity matching the target commodity satisfy the requirement for the similarities.

It can be known from the description that the requirement for the preset similarity may be determined according to the commodity parameter of the target commodity, and the commodity that satisfies the requirement for the preset similarity may be determined as the related commodity. Since the commodity parameters include various parameters, the requirement for the preset similarity can be set more flexibly, thus ensuring the similarity between the related commodity determined and the target commodity.

In an optional embodiment, S103 that commodity information of a related commodity of a target commodity presented in the target page is obtained specifically includes processes as follows:
  (1). At least one content genre estimated based on the commodity parameter of the target commodity is obtained.
  (2). Commodity information of a related commodity that matches the at least one content genre is screened from the at least one commodity matching the target commodity.

In the example of the disclosure, it is necessary to obtain the commodity parameter of the target commodity and determine the commodity introduction mode corresponding to the commodity parameter of the target commodity at first. Then, the at least one content genre may be estimated based on the commodity introduction mode of the target commodity. The at least one content genre is configured to screen the commodity information of the related commodity from the at least one commodity matching the target commodity.

Specifically, the at least one content genre may be determined by two methods as follows:
Implementation 1:
Content genres different from the content genre of the target commodity are determined from all content genres. All or some different content genres are determined as the at least one content genre. For example, all the content genres herein include: a video genre, a static genre and a live streaming genre. A correspondence relation between the content genre and the commodity introduction mode is as follows: the video genre corresponds to the video introduction, the static genre corresponds to the text and/or picture introduction, and the live streaming genre corresponds to the live streaming introduction.

Herein, if the content genre of the target commodity is the video genre, then the at least one content genre determined may be the static genre and/or the live streaming genre.
Implementation 2:
The content genre of the target commodity is determined as the at least one content genre. Specifically, if the content genre of the target commodity is the video genre, then the at least one content genre determined may be the video genre.
Implementation 3:
All content genres are determined as the at least one content genre without consideration of contents of the target commodity.

After the at least one content genre is determined, the commodity information of the related commodity that matches the at least one content genre may be screened from the at least one commodity matching the target commodity.

It can be known from the description that the at least one content genre is estimated based on the commodity parameter of the target commodity, and the commodity information of the related commodity is determined according to the at least one content genre. Thus, the content genres determined of the related commodity are more diversified, and a wider selection range is provided for the user during selection of the related commodity.

In an optional embodiment, the method further includes processes as follows:
  (1). An operation level of a browsing operation on a commodity that matches the target commodity by a user within a preset period is obtained, where the operation level is configured to indicate an operation frequency of the browsing operation.
  (2). A presentation position matching the operation level of the browsing operation is determined in the first search middle page, and the preset area is determined based on the presentation position matched.

In the example of the disclosure, the operation level of the browsing operation on the commodity that matches the target commodity by the user within the preset period may be obtained at first. During specific implementation, the operation level may be determined according to a browsing time of the commodity that matches the target commodity of the user within the preset period. The operation level may be classified into a plurality of levels, and the levels correspond to a different presentation areas in the first search middle page.

Herein, when the operation level of the browsing operation is classified, it is necessary to obtain the browsing time of the commodity that matches the target commodity of the user within the preset period, and determine an operation level interval to which the browsing time belongs at first. Then, the operation level corresponding to the operation level interval is obtained, and the operation level is determined as the operation level of the browsing operation.

For example, the preset period is 1 hour, and the preset period corresponds to three operation level intervals. Browsing operation times≤5 correspond to a third operation interval, and the third operation interval corresponds to a third operation level. When 5<browsing operation times≤10, the browsing operation times correspond to a second operation interval, and the second operation interval corresponds to a second operation level. Browsing operation times>10 corresponds to a first operation interval, and the first operation interval corresponds to the first operation level.

It should be understood that from the first operation level to the third operation level, the operation frequency corresponding to the browsing operation of the user gradually decreases, and a sequence of the presentation positions can be set according to the operation frequency corresponding to the operation level accordingly.

For example, as shown in FIG. 2, the first search middle page corresponds to three presentation positions, and each level of the operation levels corresponds to one presentation position. The first operation level corresponds to a presentation position 1, the second operation level corresponds to a presentation position 2, and the third operation level corresponds to a presentation position 3 in FIG. 2.

Figure 3:
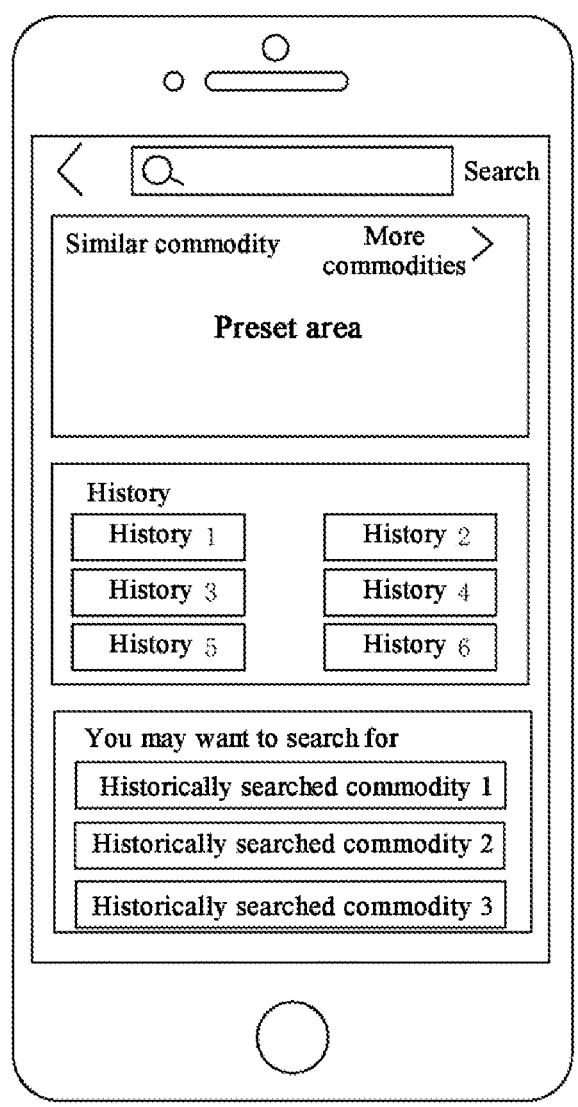
FIG. 3 shows a schematic diagram of a specific presentation method of a first search middle page according to an example of the disclosure.

As shown in FIG. 3, a specific presentation method of the first search middle page is shown. The preset area is the presentation position 1 of the first search middle page, the presentation position 2 of the first search middle page is configured to present the history, and the presentation position 3 of the first search middle page is configured to present the historically searched commodity, and a category name corresponding to the historically searched commodity may be "Guess what you think" in FIG. 3.

It can be known from the description that the presentation position in the first search middle page is determined based on the operation level of the browsing operation, flexibility of determining the presentation position is improved, and the user can conveniently view and operate a content presented in the preset area.

In an optional embodiment, the commodity information includes commodity sub-information corresponding to a plurality of content genres, each piece of commodity sub-information corresponds to one content genre, and the preset area includes a plurality of sub-areas. S105 that the commodity information of the related commodity is presented in a preset area of the first search middle page specifically includes processes as follows:

(1) An information presentation form matched is determined based on the content genre of each piece of commodity sub-information, where a plurality of types of commodity sub-information include at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio.

(2). A target view control matching the information presentation form is determined.

(3). Based on the target view control, commodity sub-information of related commodities is presented in sub-areas corresponding to the related commodities.

In the example of the disclosure, the content genres include: the video genre, the static genre and the live streaming genre. Then, the commodity sub-information corresponding to each content genre is as follows: commodity sub-information of the video genre is the commodity related video, the commodity sub-information of the static genre is the static commodity information, and commodity sub-information of the live streaming genre is the commodity live streaming information.

Thus, commodity sub-information of different content genres correspond to different information presentation forms, and view controls for presenting different information presentation forms are also different accordingly. After determining the content genre of each piece of commodity sub-information, a target view control corresponding to the information presentation form of the commodity sub-information may be determined.

Herein, the preset area for presenting commodity information includes the plurality of sub-areas, and each sub-area is configured to present corresponding commodity sub-information. Before the commodity sub-information is presented, the sub-area corresponding to the commodity sub-information of each related commodity may be determined at first, and the commodity sub-information of the related commodity may be presented in this sub-area through the target view control.

It can be known from the description that the target view control corresponding to the commodity sub-information may be determined, and the commodity sub-information of related commodity may be presented in the corresponding sub-area based on the target view control.

Thus, the commodity sub-information of different information presentation forms can be presented, diversity of presentation contents is improved, and better browsing experience is provided for the user.

In an optional embodiment, S105 that the commodity information of the related commodity is presented in a preset area of the first search middle page specifically includes processes as follows:

(1). A commodity classification tag corresponding to the related commodity is obtained, where the commodity classification tag is a category tag determined after aggregation of commodity categories of related commodities.

(2). A target view control of the commodity information of the related commodity is determined based on a number of the commodity classification tags.

(3). The commodity information of the related commodity is presented in the preset area of the first search middle page based on the target view control.

In the example of the disclosure, at least one commodity category corresponding to each related commodity may be obtained at first. The commodity category may be determined according to the commodity information of the related commodity. Herein, if the related commodity is a pencil, the corresponding commodity categories of the related commodity may include: 2 black (B), a capped pencil, and stationery.

After commodity categories corresponding to all related commodities are obtained, the commodity categories of all the related commodities may be aggregated to obtain the commodity classification tag corresponding to the related commodity. The number of the commodity classification tags is equal to a number of the commodity categories of all the related commodities.

Figure 4A:
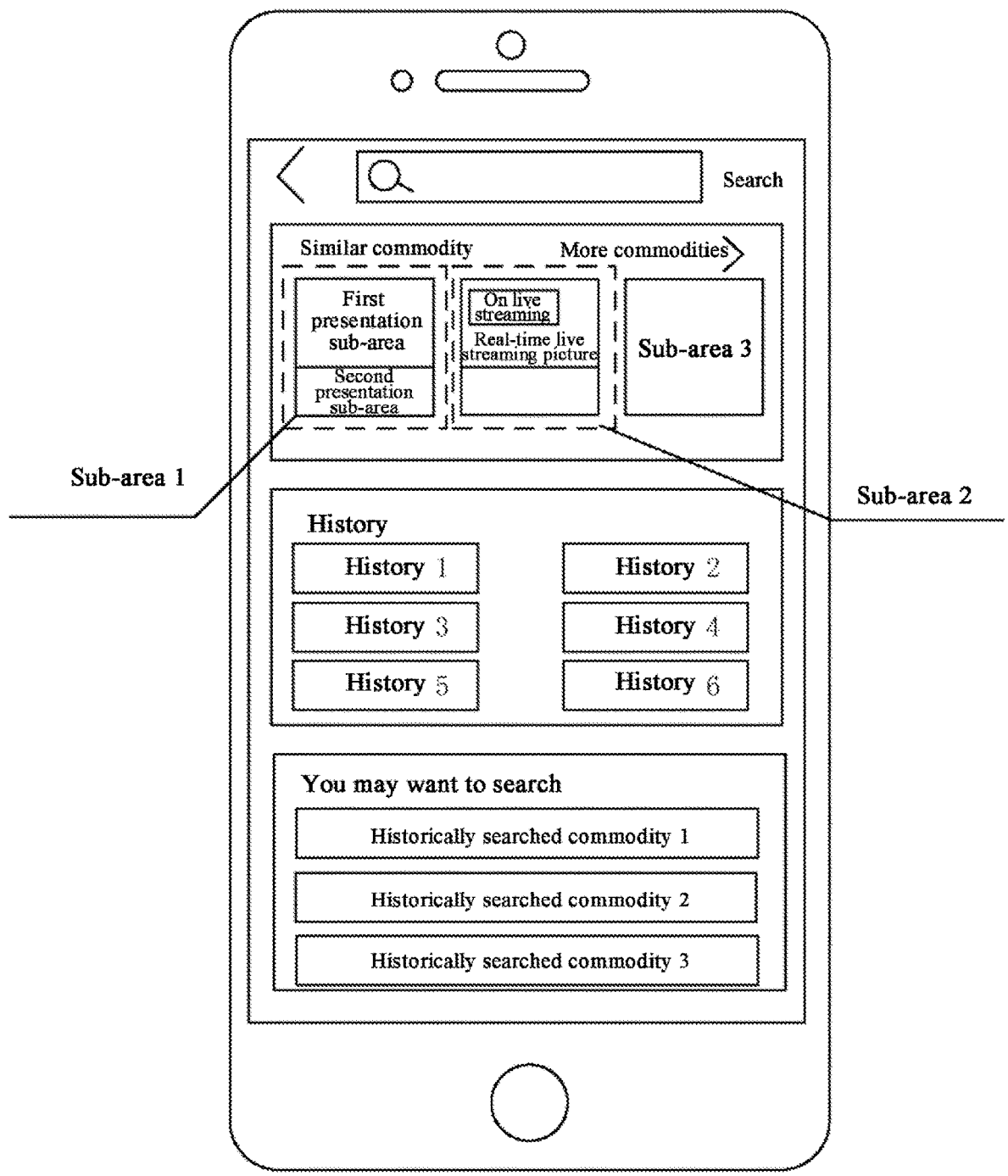
FIG. 4a shows a schematic diagram of presenting commodity information of a related commodity through a target view control according to an example of the disclosure.
Figure 4B:
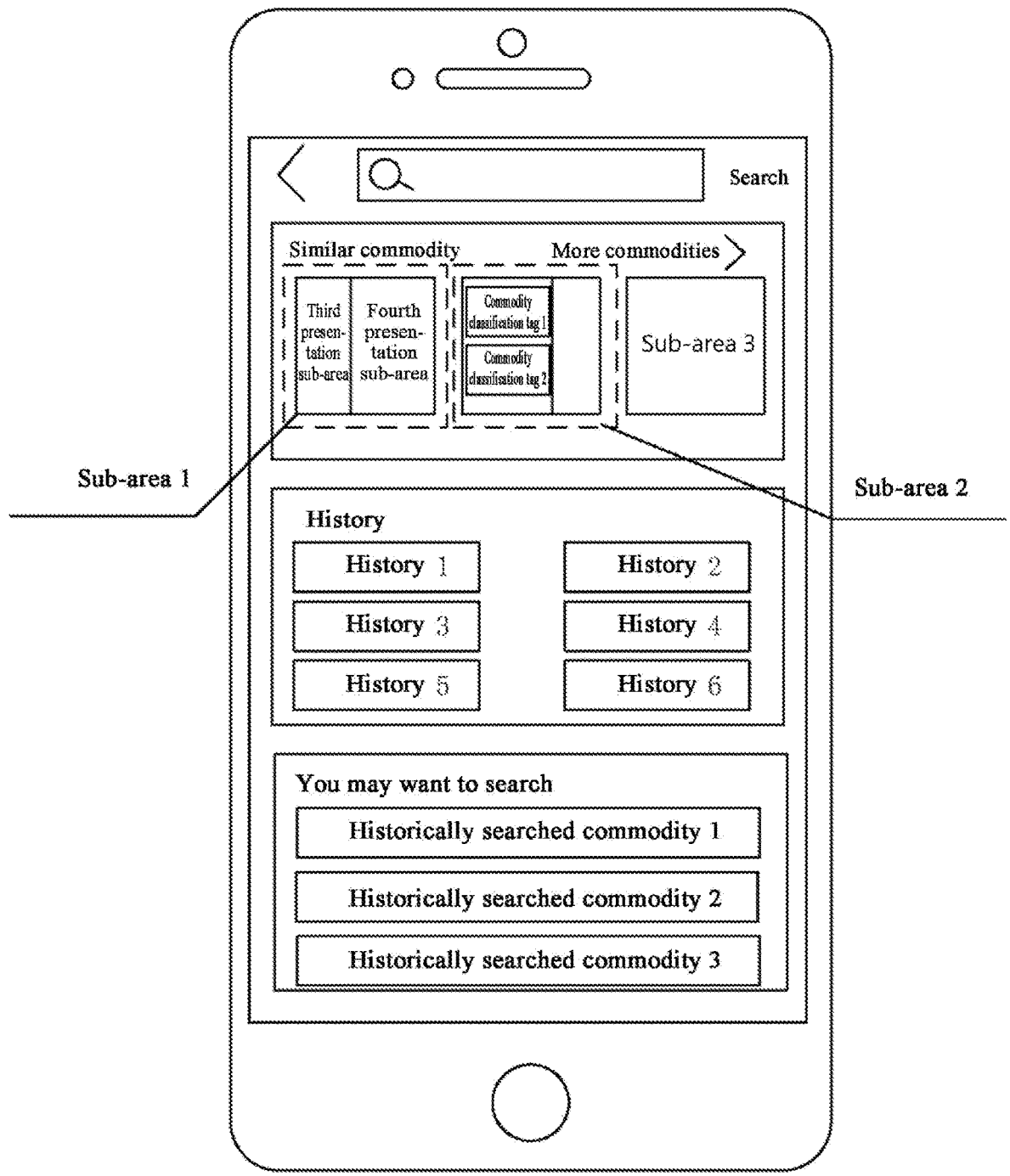
FIG. 4b shows another schematic diagram of presenting commodity information of a related commodity through a target view control according to an example of the disclosure.

In the example of the disclosure, the target view control for presenting the commodity information of related commodity may be determined based on the number of commodity classification tags. During specific implementation, when the number of commodity classification tags does not satisfy a preset number requirement, the target view control as shown in FIG. 4a is used to present the commodity information of the related commodity. When the number of commodity classification tags satisfies the preset number requirement, the target view control shown in FIG. 4b is used to present the commodity information of related commodity. A first presentation method of the target view control corresponding to FIG. 4a and a second presentation method of the target view control corresponding to FIG. 4b are specifically described as follows.

Under the condition that the commodity information is presented by the first presentation method, the first control includes a first presentation sub-area and a second presentation sub-area, and the first presentation sub-area is located above the second presentation sub-area. Thus, the step that the commodity information of the related commodity is presented in the preset area of the first search middle page based on the target view control includes:

(1). Commodity preview information of the commodity information is presented in the first presentation sub-area, where the commodity preview information includes at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio.

(2). Commodity description information of the commodity information is presented in the second presentation sub-area, where the commodity description information includes information for assisting a user in executing a corresponding decision.

In the example of the disclosure, under the condition that the commodity information is presented by the first presentation method, the preset area may be divided into a plurality of sub-areas, and each sub-area corresponds to one first control. Specifically, as shown in FIG. 4a, with a sub-area 1 as an example, the first control includes the first presentation sub-area and the second presentation sub-area. The first presentation sub-area is located above the second presentation sub-area, the first presentation sub-area is configured to present the commodity preview information and the second presentation sub-area is configured to present commodity description information.

Herein, the commodity related video may include a presentation video of the related commodity corresponding to the commodity information, and the static commodity information may include a presentation picture of the related commodity corresponding to the commodity information.

In addition, the commodity live streaming information includes any one of the following: key commodity description information including a commodity live streaming logo, and a real-time live streaming picture, and the commodity live streaming logo is a logo for jumping to a corresponding live streaming studio. As shown in FIG. 4a, with a sub-area 2 as an example, the key commodity description information of the commodity live streaming logo is "on live streaming" that floats. The floating logo floats in a upper left corner of a real-time live streaming picture.

In the example of the disclosure, the commodity description information of the commodity information may also be presented in the second presentation sub-area. Herein, the commodity description information may include text description of the related commodity corresponding to the commodity information. The commodity description information may also include information for assisting the user in executing a corresponding decision. For example, the commodity description information may include a recommendation reason of the related commodity, for example the offer information of the commodity, or the commodity description information may also include a recommendation reason of the related commodity relative to the target commodity. For example, the commodity description information may be a commodity price of the related commodity when the price of the related commodity is lower than that of the target commodity.

Herein, when the commodity description information is presented in the second presentation sub-area, the information for assisting the user in executing the corresponding decision may be highlighted, for example, font bold. Thus, the information for assisting the user in executing the corresponding decision is more eye-catching and better assists the user in making a decision.

It can be known from the description that under the condition that the commodity information is presented by the first presentation method, the commodity preview information and the commodity description information of the related commodity are presented in the first presentation sub-area and the second presentation sub-area respectively. Thus, interface layout is more reasonable and aesthetic, and the browsing experience of the user is improved.

In addition, under the condition that the commodity information is presented by the second presentation method, the target view control includes a second control, the second control includes third presentation sub-areas and a fourth presentation sub-area, and the third presentation sub-areas are located at two sides of the fourth presentation sub-area. Thus, the step that the commodity information of the related commodity is presented in the preset area of the first search middle page based on the target view control specifically includes processes as follows:

(1) At least a part of the commodity classification tags are presented in the third presentation sub-area.

(2). Commodity preview information corresponding to the commodity classification tags are determined from commodity preview information of the commodity information.

(3). The commodity preview information corresponding to the commodity classification tags is presented in the fourth presentation sub-area, where the commodity preview information includes at least one of the following: commodity live streaming information, a commodity related video and static commodity information, and the commodity related video includes a commodity usage instruction video and/or a commodity assessment video.

In the example of the disclosure, under the condition that the commodity information is presented by the second presentation method, the preset area may be divided into a plurality of sub-areas, and each sub-area corresponds to one second control. Specifically, as shown in FIG. 4b, with the sub-area 1 as an example, the second control includes the third presentation sub-areas and the fourth presentation sub-area. The third presentation sub-areas are located at the two sides of the fourth presentation sub-area, the third presentation sub-area is configured to present the commodity classification tag and the fourth presentation sub-area is configured to present the commodity preview information corresponding o the commodity classification tags.

Herein, the third presentation sub-area includes a plurality of buttons for presenting the commodity classification tags, and the fourth presentation sub-area is configured to present the commodity preview information of the related commodity. It should be noted that the commodity preview information corresponding to the commodity classification tags of the related commodity may be different, and the fourth presentation sub-area is configured to present commodity preview information corresponding to some commodity classification tag.

It can be known from the description that under the condition that the commodity information is presented by the second presentation method, the commodity classification tag and the commodity preview information of the related commodity are presented in the third presentation sub-area and the fourth presentation sub-area respectively. Thus, interface layout is more reasonable and aesthetic, and the browsing experience of the user is improved.

In an optional embodiment, under the condition that the commodity information is presented by the second presentation method, the method further includes:
  (1). Target commodity preview information corresponding to a target commodity classification tag is obtained in response to a trigger operation on the target commodity classification tag.
  (2). In the fourth presentation sub-area, the target commodity preview information corresponding to the target commodity classification tag is switchably presented.

In the example of the disclosure, the user may perform a trigger operation on a button of a commodity classification tag presented in a third presentation sub-area in the sub-area 2 as shown in FIG. 4b. After a terminal device detects the trigger operation by the user, a target commodity classification tag corresponding to the trigger operation may be determined and the target commodity preview information corresponding to the target commodity classification tag may be obtained.

After the target commodity preview information is obtained, the target commodity preview information may be switchably presented in the fourth presentation sub-area.

Figure 4C:
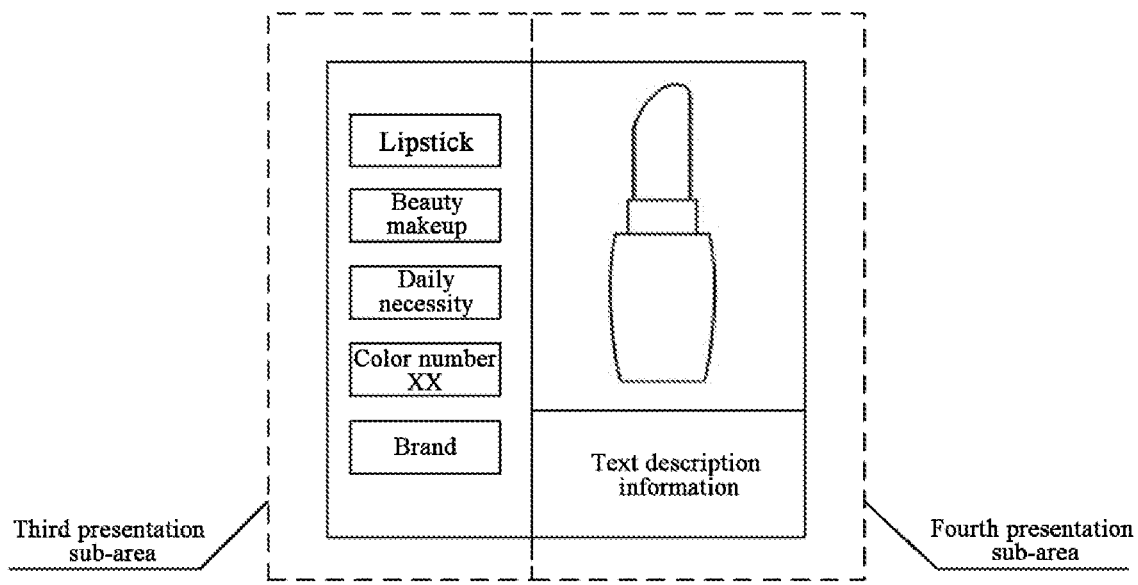
FIG. 4c shows a schematic diagram of presenting commodity information through a second control according to an example of the disclosure.

Herein, it is assumed that the related commodity is a lipstick, a schematic diagram of presenting commodity information through a second control is shown in FIG. 4c. The commodity classification tags corresponding to the commodity information of the related commodity include the lipstick, beauty makeup, a daily necessity, color number XX and a brand respectively. The commodity classification tags are presented in the third presentation sub-area. In this case, the fourth presentation sub-area of the second control displays the commodity preview information corresponding to the "lipstick" commodity classification tag.

Herein, the commodity preview information corresponding to the "lipstick" commodity classification tag is static commodity information. The static commodity information is graphic description information as shown in FIG. 4c, and the graphic description information is configured to describe commodity information of the lipstick including a commodity form and feature. In this case, it is assumed that the target commodity classification tag determined is the "beauty makeup" commodity classification tag, and the target commodity preview information corresponding to the "beauty makeup" commodity classification tag is a commodity related video. The commodity related video may be a commodity assessment video of the lipstick. Then, the static commodity information presented in the fourth presentation sub-area may be switched to the commodity assessment video.

It can be known from the description that the target commodity preview information may be switchably presented in the fourth presentation sub-area in response to the trigger operation on the target commodity classification tag. Thus, the user conveniently knows the related commodity more comprehensively through different commodity preview information and is assisted in better making decisions.

In addition, the commodity classification tag includes a plurality of sub-tags, each related commodity corresponds to at least one sub-tag, and each sub-tag is related to at least one content genre.

Specifically, the second present control may also be configured to present a plurality of related commodities. Specifically, the commodity classification tag may be composed of a plurality of sub-tags. Each related commodity corresponds to at least one sub-tag of the commodity classification tag, and each sub-tag is related to at least one content genre.

Herein, the sub-tag corresponding to the commodity classification tag may be presented in the third presentation sub-area of the second presentation control. The user may switch the commodity preview information of related commodities corresponding to the target sub-tags in the fourth presentation sub-area by triggering different target sub-tags in the third presentation sub-area.

It can be known from the description that the commodity classification tag includes the plurality of sub-tags, and each related commodity corresponds to the at least one sub-tag of the commodity classification tag. The user can view different related commodities in the second present control by triggering different sub-tags, and the browsing experience of the related commodities of the user is improved accordingly.

In an optional embodiment, the method further includes:
  (1). A target commodity introduction mode corresponding to target commodity information is determined in response to a trigger operation on the target commodity information in the first search middle page.
  (2). A commodity presentation page matching the target commodity introduction mode is obtained, where the commodity presentation page includes any one of the following: a commodity live streaming page, a commodity detail page and a commodity related video playing page.
  (3). Jumping is performed to the commodity presentation page, and commodity detail information of a target related commodity is presented in the commodity presentation page.

In the example of the disclosure, the user may also jump to the commodity presentation page of the related commodity through the first search middle page, and a specific jumping method is as follows:

Method 1:

In the example of the disclosure, with FIG. 4a as an example, the user may trigger the target commodity information that the user wants to browse in the first search middle page. After the trigger operation by the user is detected, the target commodity introduction mode corresponding to the target commodity information triggered by the trigger operation may be determined. Then, the commodity detail information of the target related commodity may be presented in the commodity presentation page.

Herein, different commodity introduction modes correspond to different commodity presentation pages. For example, the commodity presentation page corresponding to the commodity introduction mode of the video introduction is a commodity related video playing page. The playing page is configured to play a related video of the target related commodity. The commodity presentation page corresponding to the commodity introduction mode of the text and/or picture introduction is a commodity detail page. The commodity detail page is configured to present commodity details of the target related commodity in texts and/or pictures. The commodity presentation page corresponding to the commodity introduction mode of the live streaming introduction is a commodity live streaming page. The commodity live streaming page is configured to present a commodity live streaming picture of the target related commodity.

Method 2:

In the example of the disclosure, a preset position for presenting the commodity information of the related commodity may further include a jump icon. The jump icon is configured to jump to a related commodity aggregation page that includes commodity information of at least a part of the associated commodities.

Herein, the jump icon may be a "more commodities" icon as shown in FIG. 3, and is configured to obtain the commodity information of at least a part of related commodities corresponding to the jump icon after the trigger operation on the jump icon by the user is detected. The commodity information of the at least a part of related commodities is presented in the related commodity aggregation page.

In the example of the disclosure, after the trigger operation by the user on target commodity information that the user wants to browse in the related commodity aggregation page is detected, the target commodity introduction mode corresponding to the target commodity information triggered by the trigger operation may be determined. Then, the commodity detail information of the target related commodity may be presented in the commodity presentation page.

It can be known from the description that by detecting the trigger operation on the target commodity information in the first search middle page corresponding to the trigger operation by the user, the commodity detail information of the target related commodity corresponding to the trigger operation can be determined, and the commodity detail information is presented in the commodity presentation page. Thus, a step of initiating a retrieval operation on the target related commodity by the user through the search box again is omitted, retrieval efficiency of the user is improved, and the operation experience of the user is further improved.

To sum up, according to the example of the disclosure, the first search middle page is presented after the trigger operation on the search box in the target page is detected, the commodity information of the related commodity of the target commodity presented in the target page is determined, and then, the commodity information of the related commodity is presented in the preset area of the first search middle page. Thus, the search path of the user is reduced when the target commodity cannot satisfy the search intention of the user, the related commodity of the target commodity is presented to the user in a more convenient way, the accuracy of matching of the search intention of the user is improved, and the search efficiency is improved.

It can be understood by those skilled in the art that in the method of specific embodiments, a description order of the steps does not indicate a strict execution order or constitute any limitation to an implementation process, and a specific execution order of the steps should be determined according to their functions and possible internal logic.

Based on the same inventive concept, the example of the disclosure also provides an apparatus for presenting recommendation data corresponding to the method for presenting recommendation data. Since the principle of solving problems by the apparatus in the example of the disclosure is similar to that of the method for presenting recommendation data in the example of the disclosure, reference can be made to the implementation of the method for implementation of the apparatus, with repeated contents not to be repeated herein.

Figure 5:
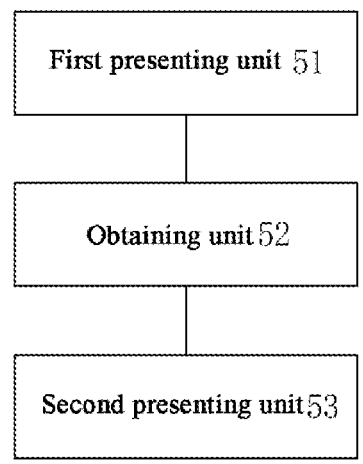
FIG. 5 shows a schematic diagram of an apparatus for presenting recommendation data according to an example of the disclosure.

As shown in FIG. 5, a schematic diagram of an apparatus for presenting recommendation data is shown according to an example of the disclosure. The apparatus includes a first presenting unit 51, an obtaining unit 52 and a second presenting unit 53.

The first presenting unit 51 is configured to present a first search middle page in response to a trigger operation on a search box in a target page.

The obtaining unit 52 is configured to obtain commodity information of a related commodity of a target commodity presented in the target page, where the commodity information corresponds to at least one content genre, and different content genres correspond to different commodity introduction modes.

The second presenting unit 53 is configured to present the commodity information of the related commodity in a preset area of the first search middle page.

According to the example of the disclosure, the first search middle page is presented after the trigger operation on the search box in the target page is detected, the commodity information of the related commodity of the target commodity presented in the target page is determined, and then, the commodity information of the related commodity is presented in the preset area of the first search middle page. Thus, a search path of a user is reduced when the target commodity cannot satisfy the search intention of the user, the related commodity of the target commodity is presented to the user in a more convenient way, accuracy of matching of a search intention of the user is improved, and search efficiency is improved.

In a possible embodiment, the apparatus is further configured to:
  determine a target commodity introduction mode corresponding to target commodity information in response to a trigger operation on the target commodity information in the first search middle page;
  obtain a commodity presentation page matching the target commodity introduction mode, where the commodity presentation page includes any one of the following: a commodity live streaming page, a commodity detail page and a commodity related video playing page; and
  jump to the commodity presentation page, and present commodity detail information of a target related commodity in the commodity presentation page.

In a possible embodiment, the related commodity is a commodity that satisfies a requirement for preset similarities in commodity parameters of the target commodity among at least one commodity matching the target commodity, where the commodity parameters include at least one of the following: a commodity attribute parameter, a commodity introduction mode, key commodity description information, commodity search information in a commodity detail page of the target commodity, and a commodity popularity parameter.

In a possible embodiment, the obtaining unit 52 is further configured to:
  obtain at least one content genre estimated based on the commodity parameter of the target commodity; and
  screen commodity information of a related commodity that matches the at least one content genre from the at least one commodity matching the target commodity.

In a possible embodiment, the apparatus is further configured to:

obtain an operation level of a browsing operation on a commodity that matches the target commodity by a user within a preset period, where the operation level is configured to indicate an operation frequency of the browsing operation; and determine a presentation position matching the operation level of the browsing operation in the first search middle page, and determine the preset area based on the presentation position matched.

In a possible embodiment, the commodity information includes commodity sub-information corresponding to a plurality of content genres, each piece of commodity sub-information corresponds to one content genre, and the preset area includes a plurality of sub-areas. The second presenting unit 53 is further configured to:

determine an information presentation form matched based on the content genre of each piece of commodity sub-information, where a plurality of types of commodity sub-information include at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio;

determine a target view control matching the information presentation form; and present, based on the target view control, commodity sub-information of related commodities in sub-areas corresponding to the related commodities.

In a possible embodiment, the second presenting unit 53 is further configured to:

obtain a commodity classification tag corresponding to the related commodity, where the commodity classification tag is a category tag determined after aggregation of commodity categories of related commodities;

determine a target view control of the commodity information of the related commodity based on a number of the commodity classification tags; and present the commodity information of the related commodity in the preset area of the first search middle page based on the target view control.

In a possible embodiment, the second presenting unit 53 is further configured as follows:

The target view control includes a first control, the first control includes a first presentation sub-area and a second presentation sub-area, and the first presentation sub-area is located above the second presentation sub-area. The second presenting unit 53 is further configured to:

present commodity preview information of the commodity information in the first presentation sub-area under the condition that the number of the commodity classification tags does not satisfy a preset number requirement, where the commodity preview information includes at least one of the following: commodity live streaming information, a commodity related video and static commodity information, the commodity live streaming information includes any one of the following: key commodity description information including a commodity live streaming icon, and a real-time live streaming picture, and the commodity live streaming icon is an icon for jumping to a corresponding live streaming studio; and present commodity description information of the commodity information in the second presentation sub-area, where the commodity description information includes information for assisting a user in executing a corresponding decision.

In a possible embodiment, the target view control includes a second control, the second control includes third presentation sub-areas and a fourth presentation sub-area, and the third presentation sub-areas are located at two sides of the fourth presentation sub-area. The second presenting unit 53 is further configured to:

present at least a part of the commodity classification tags in the third presentation sub-area under the condition that the number of the commodity classification tags satisfies a preset number requirement;

determine commodity preview information corresponding to the commodity classification tags from commodity preview information of the commodity information; and present the commodity preview information corresponding to the commodity classification tags in the fourth presentation sub-area, where the commodity preview information includes at least one of the following: commodity live streaming information, a commodity related video and static commodity information, the commodity live streaming information includes any one of the following: key commodity description information including a commodity live streaming icon, and a real-time live streaming picture, the commodity live streaming icon is an icon for jumping to a corresponding live streaming studio, and the commodity related video includes a commodity usage instruction video and/or a commodity assessment video.

In a possible embodiment, the second presenting unit 53 is further configured to:

obtain target commodity preview information corresponding to a target commodity classification tag in response to a trigger operation on the target commodity classification tag; and switchably present, in the fourth presentation sub-area, the target commodity preview information corresponding to the target commodity classification tag.

In a possible embodiment, the commodity classification tag includes a plurality of sub-tags, each related commodity corresponds to at least one sub-tag, and each sub-tag is related to at least one content genre.

For the description of the processing flow of the units in the apparatus and the interaction flow between units, reference can be made to the relevant description in the method example, which will not be described in detail herein.

Figure 6:
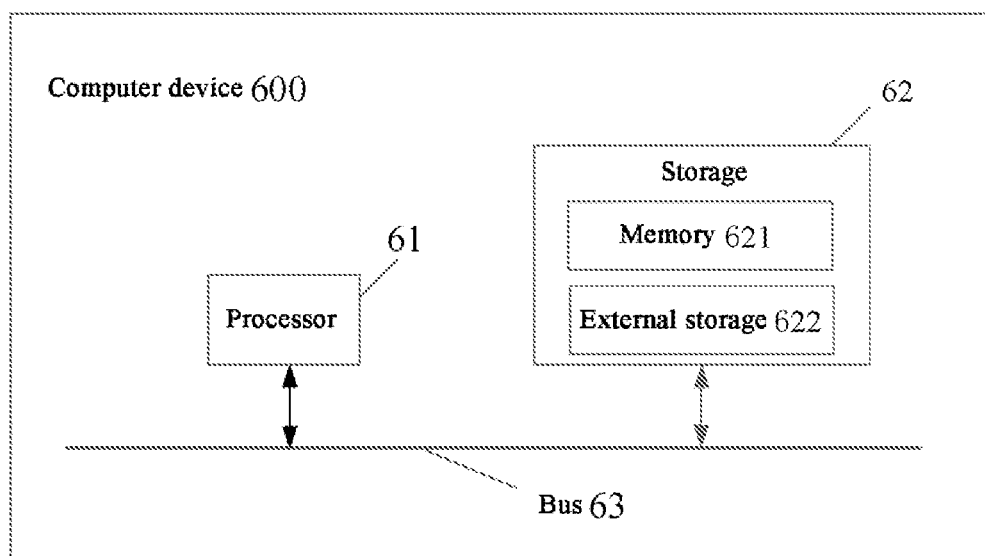
FIG. 6 is a schematic diagram of a computer device according to an example of the disclosure.

Corresponding to the method for presenting recommendation data in FIG. 1, the example of the disclosure further provides a computer device 600. As shown in FIG. 6, a structural schematic diagram of the computer device 600 is shown according to the example of the disclosure. The computer device includes:

a processor 61, a storage 62, and a bus 63. The storage 62 is configured to store execution instructions, including a memory 621 and an external storage 622. The memory 621 herein is also referred to as an internal storage, and is configured to temporarily store operation data in the processor 61 and data exchanged with the external storage 622 such as a hard disk. The processor 61 exchanges data with the external storage 622 through the memory 621, and when the computer device 600 runs, the processor 61 communicates with the storage 62 through the bus 63, so as to cause the processor 61 to executes the following instructions:

A first search middle page is presented in response to a trigger operation on a search box in a target page.

Commodity information of a related commodity of a target commodity presented in the target page is obtained, where the commodity information corresponds to at least one content genre, and different content genres correspond to different commodity introduction modes.

The commodity information of the related commodity is presented in a preset area of the first search middle page.

The example of the disclosure further provides a computer-readable storage medium. The computer-readable storage medium stores a computer program, where the computer program executes steps of the method for presenting recommendation data in the method example described above when run by a processor. The storage medium may be a volatile or nonvolatile computer-readable storage medium.

The example of the disclosure further provides a computer program product. The computer program product carries program codes, and the program codes include instructions that may be configured to execute steps of the method for presenting recommendation data in the method example described above. For details, reference can be made to the method example, which will not be repeated herein.

The computer program product may be implemented through hardware, software or their combinations. In an optional example, the computer program product is specifically embodied as a computer storage medium. In another optional example, the computer program product is specifically embodied as a software product, such as a software development kit (SDK).

Those skilled in the art can clearly understand that, for the convenience and conciseness of description, reference can be made to the corresponding processes in the method example for the specific working processes of the above system and apparatus, which will not be repeated herein. It should be understood that in the several examples provided by the disclosure, the system, the apparatus and the method disclosed can be implemented in other methods. The apparatus embodiments described above are merely schematic. For example, unit division is merely a logical function division and can have other division manners during actual implementation, for example, a plurality of units or components can be combined or integrated into another system, or some features can be omitted or not executed. On the other hand, the shown or discussed coupling or direct coupling or communication connection with each other can be indirect coupling or communication connection through some communication interfaces, apparatuses or units, and can be in electrical, mechanical or other forms.

The units described as separated parts can be physically separated or not, and the parts displayed as units can be physical units or not, that is, they can be located in one place or distributed to a plurality of network units. Some or all units can be selected according to actual needs to achieve the purposes of the solutions of the examples.

In addition, functional units in the examples of the disclosure may be integrated into one processing unit, or each unit may be physically present separately, or two or more units may be integrated into one unit.

If the functions are implemented in the form of the software functional units and sold or used as independent products, the functions can be stored in a processor-executable non-volatile computer-readable storage medium. Based on such understanding, the technical solution of the disclosure can be embodied in the form of software products in essence or a part that contributes to the prior art or a part thereof, the computer software products are stored in the storage medium, and include several instructions to make one computer device (which can be a personal computer, a server, a network device, etc.) execute all or some steps of the method of the examples of the disclosure. The foregoing storage medium includes a USB flash drive, a read-only memory (ROM), a random access memory (RAM), a diskette or an optical disk, etc., which may store program codes.

Finally, it should be noted that the examples described above are merely specific embodiments of the disclosure, and are used to describe the technical solution of the disclosure, rather than limit the same, and the protection scope of the disclosure is not limited thereto. Although the disclosure has been described in detail with reference to the foregoing examples, those skilled in the art should understand that in the technical scope of the disclosure, the technical solution described in the foregoing examples can be still modified or conceivably changed, or some of the technical features therein can be equivalently replaced. However, these modifications, changes or equivalent replacements are not intended to depart the essence of the corresponding technical solutions from the spirit and scope of the technical solutions of the example of the disclosure, and should fall within the protection scope of the disclosure. Thus, the protection scope of the disclosure should be subject to a protection scope of the claims.

I claim:

1. A method for presenting data by a computer device, comprising:
    presenting, in response to a trigger operation on a search box in a target page, a first search middle page;
    obtaining commodity information of a related commodity of a target commodity presented in the target page, wherein the commodity information corresponds to at least one content genre, and different content genres correspond to different commodity introduction modes;
    obtaining an operation frequency of a browsing operation on the related commodity by a user within a preset time period;
    determining a preset area of the first search middle page based on the operation frequency of the browsing operation; and
    presenting, in the preset area of the first search middle page, the commodity information of the related commodity.

2. The method of claim 1, further comprising:
    determining a target commodity introduction mode corresponding to target commodity information in response to a trigger operation on the target commodity information in the first search middle page;
    obtaining a commodity presentation page matching the target commodity introduction mode, wherein the commodity presentation page comprises any one of the following: a commodity live streaming page, a commodity detail page and a commodity related video playing page; and
    jumping to the commodity presentation page, and presenting commodity detail information of a target related commodity in the commodity presentation page.

3. The method of claim 1, wherein the related commodity is a commodity that satisfies a requirement for a preset similarity in commodity parameters of the target commodity among at least one commodity matching the target commodity, wherein the commodity parameters comprise at least one of the following: a commodity attribute parameter, a commodity introduction mode, key commodity description information, commodity search information in a commodity detail page of the target commodity, and a commodity popularity parameter.

4. The method of claim 3, wherein the obtaining commodity information of a related commodity of a target commodity presented in the target page comprises:
obtaining at least one content genre estimated based on the commodity parameter of the target commodity; and
screening commodity information of a related commodity that matches the at least one content genre from the at least one commodity matching the target commodity.

5. The method of claim 1,
wherein determining the preset area of the first search middle page based on the operation frequency of the browsing operation comprises:
determining a presentation position matching the operation level frequency of the browsing operation in the first search middle page, and determining the preset area based on the presentation position.

6. The method of claim 1, wherein the commodity information comprises commodity sub-information corresponding to a plurality of content genres, each piece of commodity sub-information corresponds to one content genre, and the preset area comprises a plurality of sub-areas; and
the presenting the commodity information of the related commodity in a preset area of the first search middle page comprises:
determining an information presentation form matched based on the content genre of each piece of commodity sub-information, wherein a plurality of types of commodity sub-information comprise at least one of the following: commodity live streaming information, a commodity related video and static commodity information, the commodity live streaming information comprises any one of the following: key commodity description information comprising a commodity live streaming icon, and a real-time live streaming picture, and the commodity live streaming icon is an icon for jumping to a corresponding live streaming studio;
determining a target view control matching the information presentation form; and
presenting, based on the target view control, commodity sub-information of related commodities in sub-areas corresponding to the related commodities.

7. The method of claim 1, wherein the presenting the commodity information of the related commodity in a preset area of the first search middle page comprises:
obtaining a commodity classification tag corresponding to the related commodity, wherein the commodity classification tag is a category tag determined after aggregation of commodity categories of related commodities;
determining a target view control of the commodity information of the related commodity based on a number of the commodity classification tags; and
presenting the commodity information of the related commodity in the preset area of the first search middle page based on the target view control.

8. The method of claim 7, wherein the target view control comprises a first control, the first control comprises a first presentation sub-area and a second presentation sub-area, and the first presentation sub-area is located above the second presentation sub-area; and
the presenting the commodity information of the related commodity in the preset area of the first search middle page based on the target view control comprises:
presenting commodity preview information of the commodity information in the first presentation sub-area under the condition that the number of the commodity classification tags does not satisfy a preset number requirement, wherein the commodity preview information comprises at least one of the following: commodity live streaming information, a commodity related video and static commodity information, the commodity live streaming information comprises any one of the following: key commodity description information comprising a commodity live streaming icon, and a real-time live streaming picture, and the commodity live streaming icon is an icon for jumping to a corresponding live streaming studio; and
presenting commodity description information of the commodity information in the second presentation sub-area, wherein the commodity description information comprises information for assisting a user in executing a corresponding decision.

9. The method of claim 7, wherein the target view control comprises a second control, the second control comprises third presentation sub-areas and a fourth presentation sub-area, and the third presentation sub-areas are located at two sides of the fourth presentation sub-area; and
the presenting the commodity information of the related commodity in the preset area of the first search middle page based on the target view control comprises:
presenting at least a part of the commodity classification tags in the third presentation sub-area under the condition that the number of the commodity classification tags satisfies a preset number requirement;
determining commodity preview information corresponding to the commodity classification tags from commodity preview information of the commodity information; and
presenting the commodity preview information corresponding to the commodity classification tags in the fourth presentation sub-area, wherein the commodity preview information comprises at least one of the following: commodity live streaming information, a commodity related video and static commodity information, the commodity live streaming information comprises any one of the following: key commodity description information comprising a commodity live streaming icon, and a real-time live streaming picture, the commodity live streaming icon is an icon for jumping to a corresponding live streaming studio, and the commodity related video comprises a commodity usage instruction video and/or a commodity assessment video.

10. The method of claim 9, further comprising:
obtaining target commodity preview information corresponding to a target commodity classification tag in response to a trigger operation on the target commodity classification tag; and
switchably presenting, in the fourth presentation sub-area, the target commodity preview information corresponding to the target commodity classification tag.

11. The method of claim 9, wherein the commodity classification tag comprises a plurality of sub-tags, each related commodity corresponds to at least one sub-tag, and each sub-tag is related to at least one content genre.

12. A computer device, comprising: a processor, a storage and a bus, wherein the storage stores a machine-readable instruction executable by the processor, the processor communicates with the storage through the bus when the computer device runs, and the machine-readable instruction when executed by the processor, causes the computer device to:
- present, in response to a trigger operation on a search box in a target page, a first search middle page;
- obtain commodity information of a related commodity of a target commodity presented in the target page, wherein the commodity information corresponds to at least one content genre, and different content genres correspond to different commodity introduction modes;
- obtain an operation frequency of a browsing operation on the related commodity by a user within a preset time period;
- determine a preset area of the first search middle page based on the operation frequency of the browsing operation; and
- present, in the preset area of the first search middle page, the commodity information of the related commodity.

13. The computer device of claim 12, the computer device is further caused to:
- determine a target commodity introduction mode corresponding to target commodity information in response to a trigger operation on the target commodity information in the first search middle page;
- obtain a commodity presentation page matching the target commodity introduction mode, wherein the commodity presentation page comprises any one of the following: a commodity live streaming page, a commodity detail page and a commodity related video playing page; and
- jump to the commodity presentation page, and presenting commodity detail information of a target related commodity in the commodity presentation page.

14. The computer device of claim 12, wherein the related commodity is a commodity that satisfies a requirement for a preset similarity in commodity parameters of the target commodity among at least one commodity matching the target commodity, wherein the commodity parameters comprise at least one of the following: a commodity attribute parameter, a commodity introduction mode, key commodity description information, commodity search information in a commodity detail page of the target commodity, and a commodity popularity parameter.

15. The computer device of claim 12, wherein the computer device is configured to determine the preset area of the first search middle page based on the operation frequency of the browsing operation by:
- determining a presentation position matching the operation frequency of the browsing operation in the first search middle page, and determining the preset area based on the presentation position.

16. The computer device of claim 12, wherein the commodity information comprises commodity sub-information corresponding to a plurality of content genres, each piece of commodity sub-information corresponds to one content genre, and the preset area comprises a plurality of sub-areas; and
the presenting the commodity information of the related commodity in a preset area of the first search middle page comprises:
- determining an information presentation form matched based on the content genre of each piece of commodity sub-information, wherein a plurality of types of commodity sub-information comprise at least one of the following: commodity live streaming information, a commodity related video and static commodity information, the commodity live streaming information comprises any one of the following: key commodity description information comprising a commodity live streaming icon, and a real-time live streaming picture, and the commodity live streaming icon is an icon for jumping to a corresponding live streaming studio;
- determining a target view control matching the information presentation form; and
- presenting, based on the target view control, commodity sub-information of related commodities in sub-areas corresponding to the related commodities.

17. A non-transitory computer-readable storage medium, storing a computer program, wherein the computer program when run by a processor of a computer, causes the computer to:
- present, in response to a trigger operation on a search box in a target page, a first search middle page;
- obtain commodity information of a related commodity of a target commodity presented in the target page, wherein the commodity information corresponds to at least one content genre, and different content genres correspond to different commodity introduction modes;
- obtain an operation frequency of a browsing operation on the related commodity by a user within a preset time period;
- determine a preset area of the first search middle page based on the operation frequency of the browsing operation; and
- present, in the preset area of the first search middle page, the commodity information of the related commodity.

18. The non-transitory computer-readable storage medium of claim 17, the computer is further caused to:
- determine a target commodity introduction mode corresponding to target commodity information in response to a trigger operation on the target commodity information in the first search middle page;
- obtain a commodity presentation page matching the target commodity introduction mode, wherein the commodity presentation page comprises any one of the following: a commodity live streaming page, a commodity detail page and a commodity related video playing page; and
- jump to the commodity presentation page, and presenting commodity detail information of a target related commodity in the commodity presentation page.

19. The non-transitory computer-readable storage medium of claim 17, wherein the related commodity is a commodity that satisfies a requirement for a preset similarity in commodity parameters of the target commodity among at least one commodity matching the target commodity, wherein the commodity parameters comprise at least one of the following: a commodity attribute parameter, a commodity introduction mode, key commodity description information, commodity search information in a commodity detail page of the target commodity, and a commodity popularity parameter.

20. The non-transitory computer-readable storage medium of claim 17, wherein the computer is caused to determine the preset area of the first search middle page based on the operation frequency of the browsing operation by:
- determining a presentation position matching the operation frequency of the browsing operation in the first search middle page, and determining the preset area based on the presentation position.

* * * * *